United States Patent [19]

Iwai et al.

[11] Patent Number: 4,768,931

[45] Date of Patent: Sep. 6, 1988

[54] IN-TANK TYPE MOTOR-DRIVEN PUMP

[75] Inventors: Shingo Iwai; Tetsuo Okashiro, both of Fukuyama, Japan

[73] Assignee: Mitsubishi Denki Kabushiki Kaisha, Tokyo, Japan

[21] Appl. No.: 28,116

[22] Filed: Mar. 19, 1987

[30] Foreign Application Priority Data

Mar. 19, 1986 [JP] Japan ............................. 61-41003[U]

[51] Int. Cl.$^4$ ............................................. F04B 17/04
[52] U.S. Cl. .................... 417/366; 417/422; 310/87; 310/88
[58] Field of Search ................. 417/422, 366; 310/71, 310/87, 88

[56] References Cited

U.S. PATENT DOCUMENTS

| | | | |
|---|---|---|---|
| 1,990,279 | 2/1935 | Schaffler-Glossl | 310/88 |
| 2,279,961 | 4/1942 | Whittaker | 310/88 X |
| 2,320,708 | 6/1943 | Yost | 417/422 X |
| 2,627,816 | 2/1953 | Kaatz et al. | 417/422 |
| 3,126,831 | 3/1964 | Deters | 417/422 X |
| 3,418,991 | 12/1968 | Shultz et al. | 417/366 |
| 3,716,309 | 2/1973 | Mitchell | 417/422 |
| 4,445,820 | 5/1984 | Hayashi et al. | 417/366 |

Primary Examiner—Carlton R. Croyle
Assistant Examiner—T. W. Olds
Attorney, Agent, or Firm—Oblon, Fisher, Spivak, McClelland & Maier

[57] ABSTRACT

In an in-tank type motor-driven pump actuated by feeding a power from the outside of a pump casing through an external conductor, an end of the external conductor is extended inside the pump through a through hole formed in an upper motor cover; the external conductor is held in the through hole by a supporting member, and the end of the conductor is directly or indirectly connected to a brush for the motor.

4 Claims, 2 Drawing Sheets

IN-TANK TYPE MOTOR-DRIVEN PUMP

BACKGROUND OF THE INVENTION

1. Field of the Invention

The present invention relates to an in-tank type motor-driven pump. More particularly, it relates to an improved construction for connecting an electric conductor in an in-tank type motor-driven pump.

2. Discussion of Background

FIG. 2 is a longitudinal cross-sectional view showing a conventional in-tank type motor-driven pump. A motor 2 is installed in the casing 8 of a pump 1 placed in a liquid container. An impeller 6 is fixed to a shaft 5 of the motor. When an electric power is supplied to a commutator 3 through brushes 4 from the outside of the pump 1, the impeller 6 is rotated so that liquid in the liquid container is sucked through an intake port 7 formed in a lower motor cover, and then, is discharged through a discharge port 10 formed in an upper motor cover 9 while it is passed through the interior of the casing 8, during which a pumping function is established. An end of a lead wire 11 as a first conductor is connected to each of the brushes 4. The other end of the lead wire 11 is connected to an end 12a of a first terminal 12. The first terminal 12 is firmly fitted to the upper motor cover 9 and to a bracket 13. The other end of the first terminal 12 extends out of the pump 1 to constitute a second terminal portion 12b. Another terminal 15 to which an external conductor 14 as a second conductor is connected, is connnected to the terminal portion 12b, through which an electric power is supplied to the motor. A protection member 17 made of an insulating material covers an external connecting part 16 for the pump 1 to protect it electrically and mechanically.

In the conventional in-tank type motor-driven pump, many constituting members are necessary for the external connecting part 16 to keep this part safely dry. Accordingly, connecting operators become very complicated and are considerably decreases its reliability.

SUMMARY OF THE INVENTION

It is an object of the present invention to provide an in-tank type motor-driven pump having a small number of structural elements for the terminal part, and being inexpensive, reliable and safe.

The foregoing and the other objects of the present invention to provide an in-tank type motor-driven pump which comprises a cylindrical pump casing; upper and lower motor covers sealingly attached to the top and the bottom of the pump casing respectively; a motor with a commutator held in the pump casing; a supporting member fitted in a through hole formed in the upper motor cover, the supporting member being provided with an aperture; an external conductor inserted in the aperture of the supporting member and supported by the same, an end of the external conductor extending to the inside of the pump casing; and a lead wire having one end connected directly or indirectly to the end of the external conductor and the other end connected to a brush which is in contact with the commutator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENT

Figure 1:
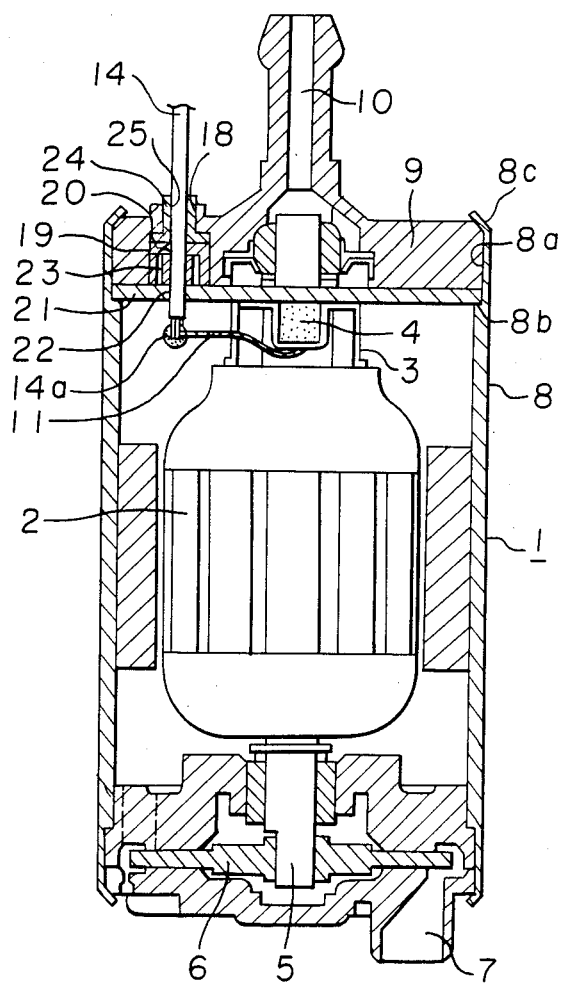
FIG. 1 is a longitudinal cross-sectional view of an embodiment of the in-tank type motor-driven pump according to the present invention and FIG. 2 is a longitudinal cross-sectional view of a conventional in-tank type motor-driven pump.
Figure 2:
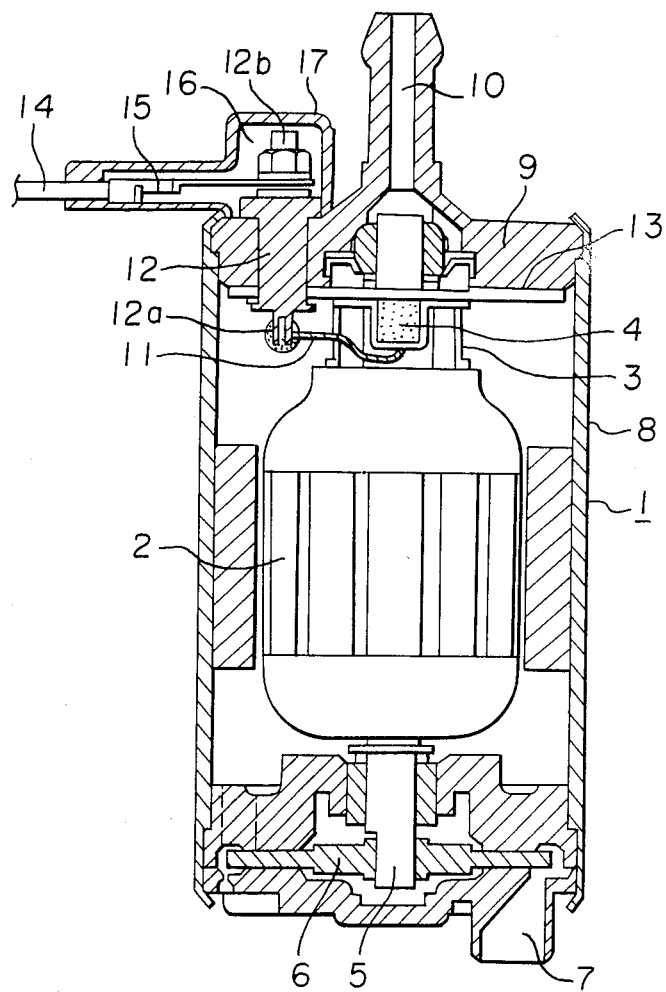

An embodiment of the present invention will be described with reference to FIG. 1, wherein the same reference numerals designate the same or corresponding parts, and therefore, description of these parts is omitted.

A reference numeral 1 designates a pump to be placed in a liquid container. The motor casing 8, in a hollow cylindrical form, of the pump has a large diameter portion 8a at its upper portion, and an upper motor cover 9 and a bracket 21 are fitted in the large diameter portion so that they are secured by the motor casing 8 at the position between the shoulder portion 8b of the large diameter portion 8a and the upper end 8c of the motor casing 8 which is bent inwardly. The bracket may be merely clamped between the upper motor cover 9 and the shoulder portion 8b.

A through hole 18 is formed in the upper motor cover 9 in the vertical direction. The through hole 18 has a an inner small diameter portion and has an outer large diameter portion adjacent bracket 2. A first supporting member 19 made of a material such as synthetic resin having gasoline-resistant properties is fitted in the large diameter portion of the through hole 18 and has a diameter larger than that of the small diameter portion of the through hole. The first supporting member 19 is of a shape of an inverted cup, and a central aperture 20 is formed at the center of the supporting member 19, through which an external conductor 14 extends. An end of the external conductor 14 is extended inside the pump casing 8 through an opening 22 which is also formed in the bracket 21 and is aligned with the through hole 18, the opening 22 having a size corresponding to the outer diameter of the external conductor 14. A lead wire 11 connects the end 14a of the external conductor 14 to a brush 4 which is in contact with a commutator 3 of a motor 2.

A second supporting member 23 in a ring form is press-fitted onto the outer periphery of the external conductor 14 in a space defined by the recess of the first supporting member 19 and the bracket 21. For the second supporting member 23, a material permitting press-fitting may be used. The outer diameter of the second supporting member 23 is slightly greater than the aperture 20 in the first supporting member 19 and the opening 22 in the bracket 21, whereby these members act as stoppers to the second supporting member 23 to thereby prevent the conductor 14 from coming off from the pump.

A sealing and cushion member 24, which is made of a material such as rubber is fitted in the upper portion of the through hole 18 formed in the upper motor cover 9. The sealing and cushion member 24 has a cylindrical portion corresponding to the small diameter portion and a flange portion correspondent to the large diameter portion of the through hole 18, and is forcibly inserted in these portions and secured between the through hole 18 and the first supporting member 19.

With this structure, the sealing and cushion member 24 is certainly held in the through hole 18. The external conductor 14 passes through a vertically extending hole 25 formed in ths sealing and cushion member 24 so as to extend from the outside of the pump to the inside of the motor casing 8. With this construction, reliability of the connecting and sealing structure according to the present invention is further improved.

In accordance with the present invention, the external conductor is directly introduced inside the pump. Accordingly, the construction of the connecting part is simplified and work for connecting the structural elements can be easy. Further, since connecting elements are recieved in the pump, they are protected from an external force or vibrations to be applied thereto. Accordingly, safeness and reliability on the connecting structure of the present invention are high.

Obviously, numerous modifications and variations of the present invention are possible in light of the above teachings. It is therefore to be understood that within the scope of the appended claims, the invention may be practiced otherwise than as specifically described herein.

What is claimed is:

1. An in-tank type motor driven pump comprising:
   a cylindrical pump casing;
   upper and lower motor covers respectively sealingly attached to the top and bottom of said pump casing, said upper motor cover having a through hole;
   a motor with a commutator held in said pump casing;
   a bracket fitted to said upper motor cover in said casing and having an opening at a position substantially aligned with said through hole;
   a first supporting member fitted in said through hole and having the form of an inverted cup including a central aperture substantially aligned with said opening;
   an external conductor extending from outside said upper motor cover through said through hole, said central aperture and said opening to the inside of said pump casing;
   a lead wire connected between said external conductor and said motor; and
   a ring shaped second supporting member fitted in said first supporting member and the entire said second supporting member being positioned axially between said central aperture and said opening, said second supporting member being press fitted on said external conductor and having an outer diameter greater than that of said central aperture and that of said opening, whereby said outer conductor is prevented from coming off of said pump.

2. The pump of claim 1 including sealing and cushioning means fitted in said through hole between said external conductor and an inner wall of said through hole.

3. The pump of claim 2 wherein said through hole has an inner large diameter portion adjacent said bracket and an outer small diameter portion, and wherein said first supporting member is in said large diameter portion and has a diameter larger than that of said small diameter portion.

4. The pump of claim 3 wherein said sealing and cushioning means is fitted in said small diameter portion.

* * * * *